United States Patent [19]

Mashimo et al.

[11] 4,367,937

[45] Jan. 11, 1983

[54] MOTOR DRIVEN CAMERA

[75] Inventors: Yukio Mashimo, Tokyo; Tomonori Iwashita, Huchu, both of Japan

[73] Assignee: Canon Kabushiki Kaisha, Tokyo, Japan

[21] Appl. No.: 81,334

[22] Filed: Oct. 3, 1979

Related U.S. Application Data

[63] Continuation of Ser. No. 888,469, Mar. 20, 1978, abandoned.

[30] Foreign Application Priority Data

Mar. 24, 1977 [JP] Japan ................................. 52-32492
Apr. 11, 1977 [JP] Japan ................................. 52-41094

[51] Int. Cl.³ ........................... G03B 1/18; G03B 7/26
[52] U.S. Cl. ................................. 354/173; 354/60 R
[58] Field of Search ........ 354/171, 173, 238, 266–268, 354/60 R

[56] References Cited

U.S. PATENT DOCUMENTS 3,961,342  6/1976  Maida ........................... 354/238 X
4,015,198  3/1977  Iwashita et al. ................ 354/173 X Primary Examiner—Joseph W. Hartary
Assistant Examiner—William B. Perkey
Attorney, Agent, or Firm—Toren, McGeady & Stanger

[57] ABSTRACT

A co-ordination control system for a camera and a motor drive unit with separate electrical power sources one of which has a higher voltage than the other. The system is provided with an interface circuit including two switching elements arranged to cooperate with a common release button and connected between the circuitries of the camera and the unit so that the higher voltage of the source in the unit is prevented from being applied to the circuitry of the camera. For remotely controlled photographic purposes, the system is further provided with a control circuit for actuating these two switching elements in time-displaced relation to each other.

9 Claims, 6 Drawing Figures

MOTOR DRIVEN CAMERA

This is a continuation of application, Ser. No. 888,469, filed Mar. 20, 1978 now abandoned.

BACKGROUND OF THE INVENTION

1. Field of the Invention

This invention relates to motor driven cameras, and more particularly to a control system for co-ordinating a camera and a motor drive unit with a common release actuating button which may be provided in either one of them.

2. Description of the Prior Art

The conventional motor driven camera has two release actuating members one in the camera body and the other in the motor drive unit, while the camera is co-ordinated with the motor drive unit by making use of two switch elements S1 and S2 in the camera body 1, or S1D and S2D in the unit body 2 as shown in FIG. 1. When either one of the actuating members or shutter release buttons is depressed, the first switch element S1 or S1D is closed to start light-metering operation by a circuit 5 in the camera body 1, and is followed by closure of the second switch element S2 or S2D which results in actuation of a camera release. At the completion of an exposure, a motor control circuit 6 is actuated to drive a film winding and shutter cocking mechanism for one cycle of operation. After each cycle of winding operation, the shutter release button is rendered effective to perform the next actuation of the camera release.

Recently, a motor driven camera having a plurality of switched positions for a continuous succession of frame exposures at a high or slow speed and a single frame operation has been developed. In the case of the continuous succession of frame exposures, it is required to start operation of the motor drive unit at the time of actuation of the camera release. For this purpose, the second switch element S2 or S2D is utilized to control actuation of operation of the motor. As the operating voltage for the motor is generally set to 18 volts, being higher than that for the electromagnet controlling the period of actuation of the shutter, for example, 6 volts, it has been the prior art practice to employ a reverse current preventing means or diode 7 as connected between any one of the second switch elements S2 and S2D and the camera control circuit 5, or otherwise the circuit 5 will be damaged by application of the excess voltage thereto, when the second switch element S2 or S2D is opened to cut off the motor drive control circuit 6 from the earth.

The employment of the reverse current prevent diode 7, however, gives rise to disadvantages that, because of a voltage drop (about 0.6 volts) across the diode 7, the satisfactory operating level for the camera must be increased by a corresponding voltage difference to shorten the life-time of a battery in the camera body and to make it more difficult to effect satisfactory performance of the camera as the ambient temperature is decreased, and that, because of the requirement of a high voltage resisting characteristic for the diode 7, it is impossible to fablicate the diode 7 as a part of an integrated circuit with limitation to the design flexibility allowing a camera of reduced size and with increase in the production cost.

It is an object of the present invention to provide a motor driven camera of the type having a plurality of operating modes which has overcome the above mentioned conventional drawbacks.

To achieve this, there is provided an interface circuit between the circuitry of the camera body and that of the motor drive unit to prevent application of an excessive voltage from the motor drive unit to the camera when the second switch element is operated.

Another object of the present invention is to provide a motor driven camera with an electronic device for remote control photography adapted to cooperate with the above described interface circuit.

These and other objects and features of the present invention will become apparent from the following detailed description taken in conjunction with the accompanying drawings in which:

DESCRIPTION OF THE PREFERRED EMBODIMENTS

Figure 2:
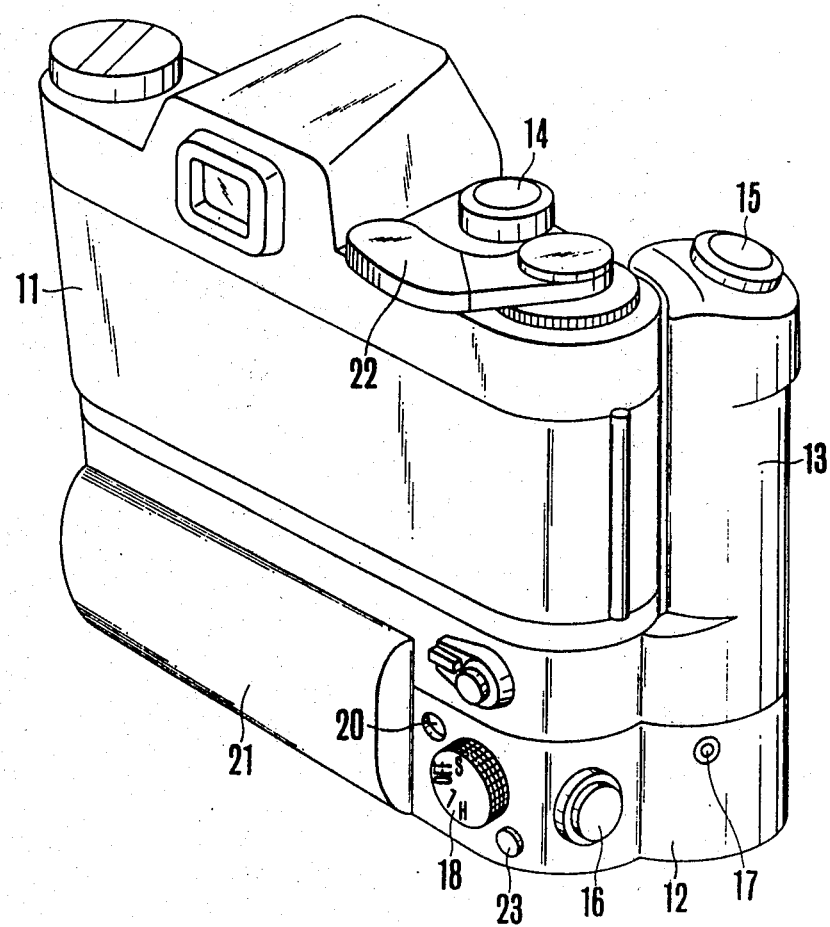
FIG. 2 is a perspective back view of one embodiment of a motor driven camera according to the present invention.
Figure 3:
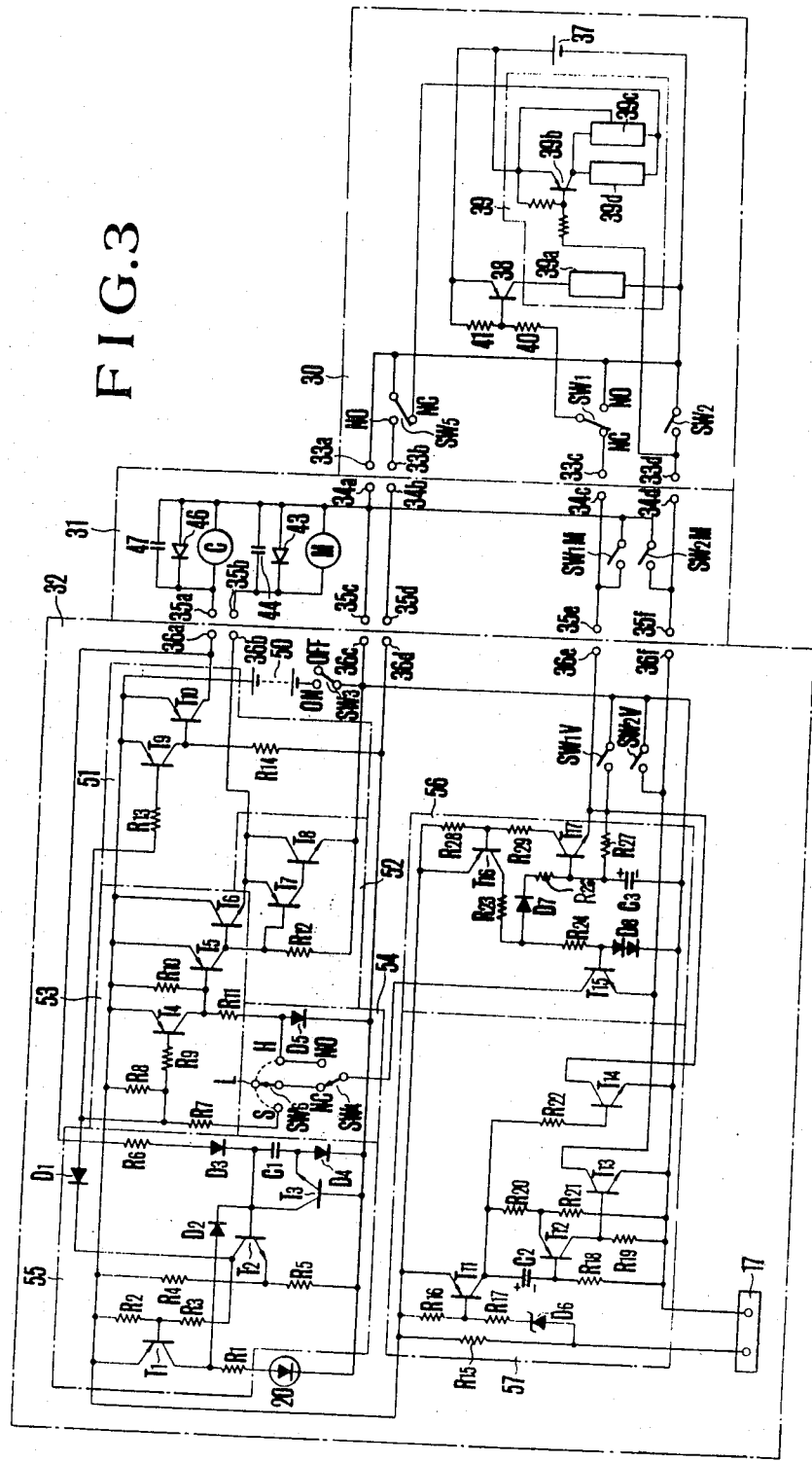
FIG. 3 is an electrical circuit diagram, partly in block form, of the camera of FIG. 2.

Referring to FIGS. 2 and 3 first to FIG. 2, there is shown a camera body 11 with a motor drive unit 12 dismountably attached to the camera body 11 along with a grip 13. Three release actuating buttons 14, 15 and 16 are provided on the camera body 11, grip 13 and unit 12 respectively. The first button 14 is what is called the shutter button. The second button 15 is located on the head of the grip 13 so that the operator is easy to manipulate that button while holding the camera at the grip 13. The third button 16 may be advantageously used when the camera is disposed with the right side upward. At the right hand back corner of the unit 12 are shown a plug 17 for remote control photography, a mode selector knob 18 having a plurality of switched positions including ones designated S (single frame operation), L (continuous succession of frame exposures with slow intervals) and H (continuous succession of frame exposures with fast intervals), a window behind which is positioned an indicator 20 for indicating occurrence of faulty operation of the motor drive unit resulting from, for example, no more fresh film frame, and a control button 23 for independent selection of the particular operating mode H. A battery chamber in the unit 12 is indicated at 21. The camera body 11 has a film winding lever 22 operable independently of the motor drive unit 12 to advance the film and to cock the shutter.

FIG. 3 shows the various circuit sections 30, 31 and 32 incorporated in the camera body 11, grip 13 and unit 12 respectively, with four interconnection terminals 33a to 33d arranged on the camera housing to be connectable with respective terminals 34a to 34d which are arranged on the grip housing, and with additional six terminals 35a to 35f of the grip housing arranged to be connectable with terminals 36a to 36f which are arranged on the unit housing.

Block 30 includes an electrical power source or battery 37 whose voltage is set to a level, for example, 6 volts, a first switch element Sw1 arranged upon depression of the shutter button 14 to a first stroke to be moved from its "NC" to its "NO" position where a current flows from the battery 37 through series-connected resistors 40 and 41 to turn on a first power supply control transistor 38 so that a light-metering circuit 39a starts to operate, and a second switch element SW2 arranged upon further depression of the shutter button 14 to the second stroke to be closed so that a second power supply control transistor 39b is turned on to start operation of first and second electromagnets 39c and 39d controlling actuation of the camera release and an exposure determining means respectively. The switch SW2 is connected between the terminal 33d and the minus side of the battery 37 and is closed by the operation of the release button 14. The switch SW5 is connected to the "NO" position of the fixed contact connected to the terminal 33b when the exposure is completed, and the movable contact is designed to be connected to the minus side of the battery 37 together with the terminal 33a.

Between the plus side of the battery 37 and the NC position of the fixed contact of the switch SW5, there are connected a magnetic release circuit 39c and an exposure determining circuit 39d. The base of the transistor 39b is connected between the switch SW2 and the terminal 33d through a resistor, and when the switch SW2 is closed the transistor 39d becomes on to supply power to the magnetic release circuit 39c as well as the exposure determining circuit 39d. When the shutter is closed, a switch SW5 is set from its "NC" to its "NO" position, where the first and second electromagnets 39c and 39d are cut off from the battery 37 so that the second switch element SW2 is no longer effective to actuate the electromagnets 39c and 39d. Without the motor drive unit 12 and the grip 13, when the lever 22 is cocked, the shutter is reset and the switch SW5 is moved to "NO" position.

Block 31 includes an electric motor M, a diode 43 connected across the winding of the motor M, a condenser 44 connected in parallel to the diode 43, these parts being connected at their one poles through a common lead to the terminal 34a and at their opposite poles through a common lead to the terminal 35b, a clutch C of the electromagnetic type through which motion of the motor M is transmitted to a film winding and shutter cocking mechanism not shown in the camera body 11 when the solenoid 45 is energized, a diode 46 connected across the solenoid 45, and a condenser 47 connected in parallel to the diode 46, these parts being connected at their one poles through a common lead to the terminal 34a and at their opposite poles through a common lead to the terminal 35a. Block 31 further includes first and second switch elements SW1M and SW2M arranged to be closed when the button 15 is depressed through a first stroke and then through a second stroke, respectively, with the movable contacts of SW1M and SW2M being connected through a common lead to the terminal 34a, and with the fixed contacts being connected through respective leads to the both of the terminals 34c and 35e and to the both of the terminals 34d and 35f.

Block 32 comprises an electrical power source or battery 50 whose voltage is set to a higher level than that of the battery 37 in the camera body 11, for example, 18 volts, a main switch SW3 connected in the negative bus, a motor drive circuit 53 responsive either to closure of the second switch element SW2V when in H mode or to "NO" setting of the shutter closure responsive switch SW5 when in L mode, or to "NO" setting of SW5 followed by the opening of the once actuated SW2V when in S mode, for energizing the motor M with electrical power supply from the battery 50, a clutch drive control circuit 51 responsive either to "NO" setting of SW5 when in H or L mode or to "NO" setting of SW5 followed by the opening of the once actuated SW2V when in S mode for energizing the solenoid 45 with electrical power supply from the battery 50, a braking circuit 52 for the motor M, a mode selecting circuit 54, a monitoring circuit 55 responsive to an excess of duration of winding operation for stopping the motor M and clutch C simultaneously from further energization and for displaying the occurrence of such state, an interface circuit 56, and an actuating circuit 57 having a similar function to that of the switch element assembly SW1V and SW2V, the SW1V and SW2V being arranged to be closed when the third button 16 is depressed to a first and second stroke respectively, and adapted for use in remote control photography, each of which will be explained in detail below.

The motor drive control circuit 53 comprises resistors R7 and R8 connected in series to each other between the positive bus and a fixed contact S of a mode selector switch SW6, a first transistor T4 with a base connected through a resistor R9 to a point on connection between resistors R7 and R8, and with an emitter connected to the positive bus, a second transistor T5 with a base connected to the collector of first transistor T4 and also to a point on connection between resistors R10 and R11, and an emitter connected to the positive bus, and a third transistor T6 with a base connected to the collector of second transistor T5, with a collector connected to the positive bus, and with an emitter connected through terminals 36b and 35b to the motor M. The opposite end of resistor R11 is connected either to the negative bus through a diode D5 and SW5 and to a fixed contact H of SW6, so that conduction of the transistor T6 for the motor M is controlled, depending upon the switched positions of SW5 and SW6.

The clutch drive control circuit 51 comprises a first transistor T9 with a base connected through a resistor R13 and the resistor R7 to SW6 at S, with an emitter connected to the positive bus and with a collector connected through a resistor R14 and SW5 to the negative bus, and a second transistor T10 with a base connected to the collector of the first transistor T9 and with an emitter and collector connected in the power supply line to the clutch solenoid 45.

The motor braking circuit 52 comprises a first transistor T7 with a base connected to a point on connection between the collector of transistor T5 and a resistor R12 and with an emitter connected to the emitter of the transistor T6 so that when the transistor T6 for the motor M is rendered nonconducting, a second transistor T8 connected across the winding of the motor M is rendered conducting by the first transistor T7 having a collector connected to the base of the second transistor T8.

The monitoring circuit 55 includes a resistor R6, and a timing capacitor C1 connected in series to the resistor R6 between the collector of the transistor T10, and the fixed contact "NO" of SW5 through terminals 36d, 35d, 34b and 33b, so that when a particular winding operation is not completed within a time interval, for example, 500 milliseconds, determined to be longer than that necessary to complete one cycle of normal winding operation and usually ranging from 100 to 300 milliseconds, the timing circuit produces an output which is applied to a base of a transistor T2 with an emitter connected to a point on connection between resistors R4 and R5 and with a collector connected through a diode D1 both to the base of transistor T4 through the resistor R9 and to the base of transistor T9 through an resistor R13, thereby the transistor T4 is turned on to de-energize the motor M, and the transistor T9 is turned on to de-energize the clutch C. Conduction of the transistor Tr2 also causes conduction of a transistor T1 so that a light-emitting diode 20 as the indicator of FIG. 2 is energized to be lit, informing of a fact that no more fresh area is available in the film, for example. The transistor T1 has an emitter connected to the positive bus, a collector connected through a resistor R1 to the light-emitting diode 20, and a base connected to a point on connection between resistors R2 and R3 which are connected between the positive bus and the collector of the transistor T2. To discharge the timing capacitor C1 when each cycle of normal winding operation is completed, there is provided a transistor T3 with a collector connected to the positive pole of the capacitor C1, with an emitter connected to the negative pole of the capacitor C1, and with a base connected through the resistors R5 and R4 to the positive bus so that when SW5 is set to "NC" position, the transistor T3 is turned on to short-circuit the timing capacitor C1, as a diode D3 is connected between the resistor R6 and capacitor C1 and a diode D4 is connected between the capacitor C1 and the base of transistor T3.

The interface circuit 56 includes a capacitor C3 which is charged to about 6 volts from the battery 37 in the camera body through a resistor R27, terminals 36e, 35e, 34c and 33c, SW1 in "NC" position, and the resistors 40 and 41 before the button 16 is depressed, and a first switching element or transistor T17 with a base connected to the positive pole of the capacitor C3 and with an emitter connected to the fixed contact of SW1V, so that when SW1V is closed, a current is drawn from the base of the transistor T17 by the charge on the capacitor C3. The collector of the transistor T17 is connected to the positive bus through resistors R28 and R29 which are connected in series to each other. A point on connection between the resistors R28 and R29 is connected to a base of a transistor T16 with an emitter connected to the positive bus and with a collector connected through a resistor R23, a diode D7 and a resistor R26 to the base of the transistor T17, so that once the transistor T17 is turned on, the conduction of the transistor T17 is held so long as the SW1V is closed. The interface circuit 56 further includes a second switching element or transistor T15 with an emitter connected to the fixed contact of SW2V, with a base connected to a point on connection between a resistor R24 and a diode string D8 which are connected between the resistor R23 and the negative bus, and with a collector connected to a movable contact of the switch SW4 so that when the SW2V is closed, the transistor T15 is effective to actuate the motor drive control circuit 53 for energization of the motor M, provided that the SW6 is in H position, or the SW4 is in "NO" position for the H mode. When the once closed switch SW2V is opened, the transistor T15 is rendered non-conducting to actuate the motor and clutch drive control circuits 53 and 51 for energization of the motor M and the clutch C simultaneously, provided that SW6 is in S position and SW4 is in "NC" position.

The actuating circuit 57 includes a first transistor T14 having a similar function to that of SW1, SW1M or SW1V with a collector connected to the fixed contact of SW1V, and with an emitter connected to the negative bus, a second transistor T13 having a similar function to that of SW2, SW2M or SW2V with a collector connected to the fixed contact of SW2V and with an emitter connected to the negative bus, and a circuit responsive to appearance of an actuating signal at the plug 17 for causing the first and second transistors T14 and T13 to be conducting in time-displaced relation as determined by a timing circuit of a resistor R18 and a capacitor C2. This circuit comprises a resistor R15 connected between one terminal of the plug 17 and the positive bus, a series circuit of a constant voltage diode D6, and two resistors R16 and R17, a transistor T11 with a base connected to a point on connection between the resistor R16, and R17, with an emitter connected to the positive bus, and with a collector connected through a resistor R22 to the base of the transistor T14, and a transistor T12 with a base connected to the output of the timing circuit, with an emitter connected to a point on connection between resistors R20 and R21 which are connected between the collector of the transistor T11 and the negative bus, and with a collector connected to the base of the transistor T13 and also to the negative bus through a resistor R19.

The operation of the motor driven camera of FIGS. 2 and 3 is as follows. When a continuous succession of frame exposures with fast intervals are to be made, the operator will turn the control knob 18 to place a symbol H in registry with an index not shown. Instead of using the control knob 18, the button 23 may be depressed provided that the control knob 18 was set to either one of the positions L and S. When either one of the release actuating buttons 15 and 16 is depressed to a first stroke, the switching transistor 38 in the camera body is turned on so that the light-metering circuit 39a starts to operate in a manner similar to that in which the camera operates without the motor drive unit. Upon further depression of the button 15 or 16, the first electromagnet 39c is actuated to initiate an exposure, and at the same time, the motor M is driven for rotation as a current flows through a circuit which can be traced from the positive bus through the resistors R10 and R11, SW6, SW4, transistor T15 and SW2V to the negative bus, while the clutch C remains de-energized so that motion of the motor M is not transmitted to the film winding mechanism. When the shutter is closed to terminate the exposure, SW5 is set from "NC" to "NO" position where the clutch C is actuated to start transmission of motion of the motor M to the film winding mechanism. When the shutter is reset to the cocked position, SW5 is set again to "NC" position where the transistor T10 is turned off to deactuate the clutch C, and a next release of the camera is actuated for a second frame exposure since the release button 15 or 16 remains depressed. Such procedure repeats itself until the force exerted to depress the button 15 or 16 is removed. If this occurs at a point in time during the winding process, the conduction of the transistor T5 is retained by the diode D5. When the winding operation is completed to set SW5 to "NC" position, the transistor T5 is turned off and then the transistor T6 is turned off. Non-conduction of the transistor T6 causes generation of a potential difference between the emitter and base of the transistor T7 which causes conduction of the transistor T8, thereby the winding of the motor M is short-circuited to brake the motor M. It is to be understood that the voltage of the battery 50 in the motor drive unit 12 is prevent from applying to the control circuit 30 in the camera body 11 by making use of the first and second electronic switching elements T17 and T15 respectively as arranged to cooperate with the first and second mechanical actuating switches SW1V and SW2V.

In L mode, the full depression of the button 15 or 16 leads to the making of a first exposure in a manner similar to that described in connection with H mode, but not to the simultaneous occurrence of the energization of the motor M, because the motor drive control circuit 53 is cut off from the interface circuit 56 at the mode selector switch SW6. When the sutter is closed to set the SW5 to "NO" position, a base current of the transistor T5 is allowed to flow through the resistor R11, diode D5, terminals 36d and 35d and the switch SW5 in "NO" position to the negative bus. At the same time, a base current of the transistor T10 is allowed to flow through the resistor R14, terminals 36d and 35d, and the switch SW5 in "NO" position to the negative bus. Therefore, the motor M and the clutch C are simultaneously actuated to advance the film through the length of one frame. When SW5 is set again to "NO" position, the motor M and the clutch C are de-energized, and the braking circuit 52 starts to operate in a manner similar to that when in H mode. If the button 15 or 16 remains depressed at this time, the setting of SW5 to "NC" position starts to actuate a second release of the camera. It is to be noted here that when in L mode, a time interval between the termination of the first exposure and the initiation of the second exposure is longer than that in H mode by a magnitude corresponding to the speeding-up transient of the motor M.

For single frame operation, it is convenient that SW6 is left set in S position because H mode is available by operating SW4 regardless of the "S" setting of SW6, and because L mode is available by operating the shutter button 14 regardless of what position the SW4 and SW6 are set in. Unlike the modes H and L, it is made impossible in L mode to start the energization of the motor M and clutch C at the time of setting SW5 from "NC" to "NO" position, so long as the button 15 or 16 remains depressed, since the transistors T4 and T9 are turned on by the output of the transistor T15 to maintain the transistors T6 and T10 non-conducting with the result that the motor M and clutch C remains stationary at that time. When the force exerted to depress the button 15 or 16 is removed, the transistor T15 is turned off to effect the start of energization of the motor M and clutch C simultaneously. The setting of SW5 to "NC" position leads to actuation of the next stage transistors T5 and T10 for non-conduction, resulting in the de-energization of the motor M and clutch C.

In photography with a remote control device having an operating member connected to the plug 17, when the circuit 57 is short-circuited at the plug 17, a base current of the transistor T11 is allowed to flow through the resistor R17, and constant voltage diode D6. Conducting of the transistor T11 causes conducting of the transistor T14 which produces the same function as that of SW1V when closed. As the time constant of the timing circuit R18 and C2 is adjusted by taking into account the light-response characteristics of the exposure control circuit, the conduction of the transistor T14 is followed after that time constant by the conduction of the transistor T13 which produces the same effect as that of the closure of SW2V.

Figure 1:
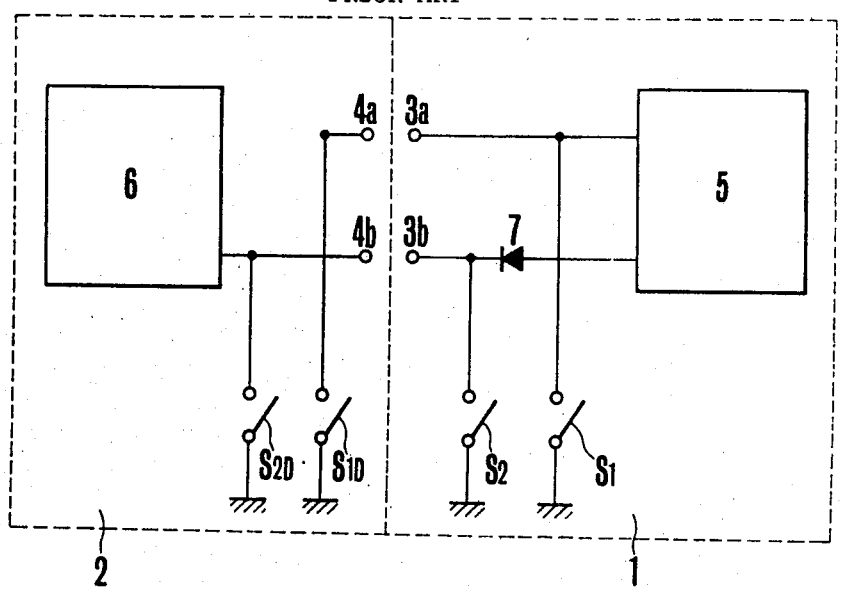
FIG. 1 is a schematic representation of a camera co-ordinated with a motor drive unit according to the prior art.
Figure 6:
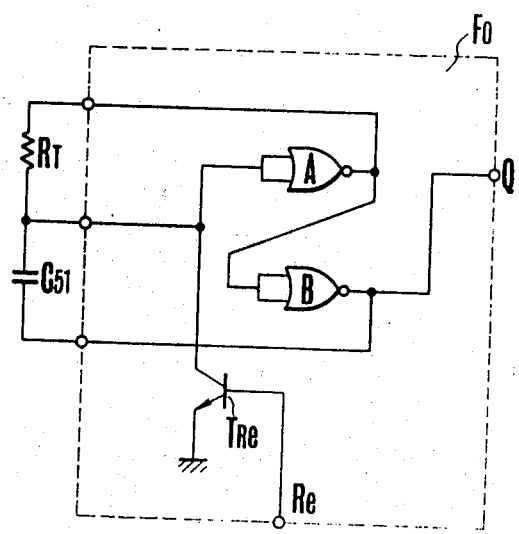
FIG. 6 is an electrical circuit diagram of an example of the oscillator of FIG. 5.
Figure 4:
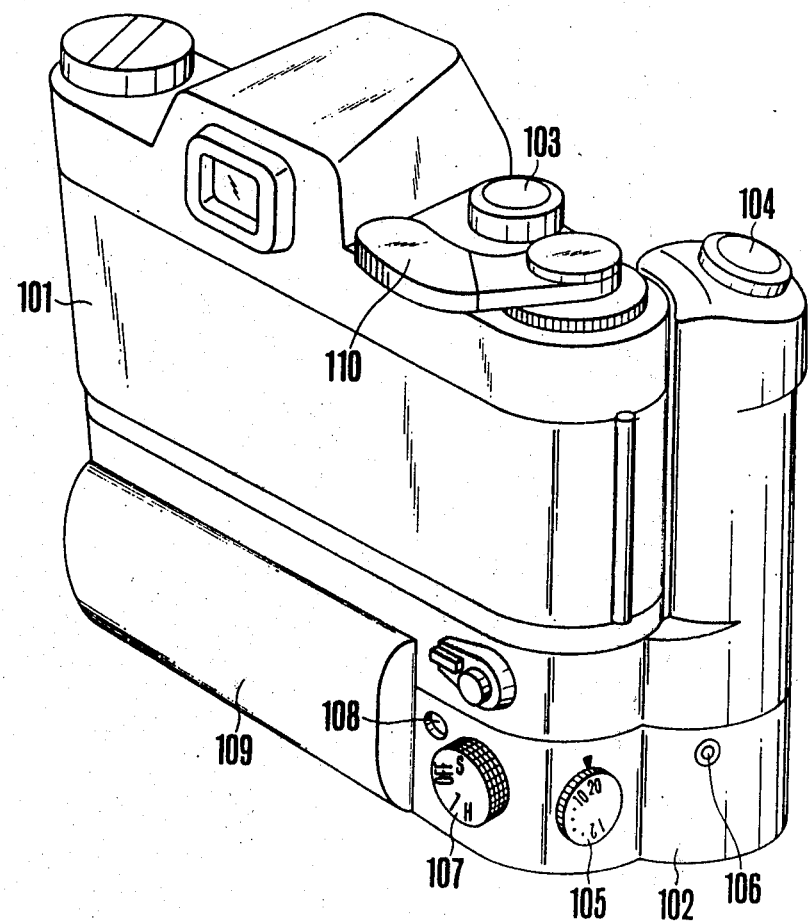
FIG. 4 is a perspective back view of another embodiment of the present invention.
Figure 5:
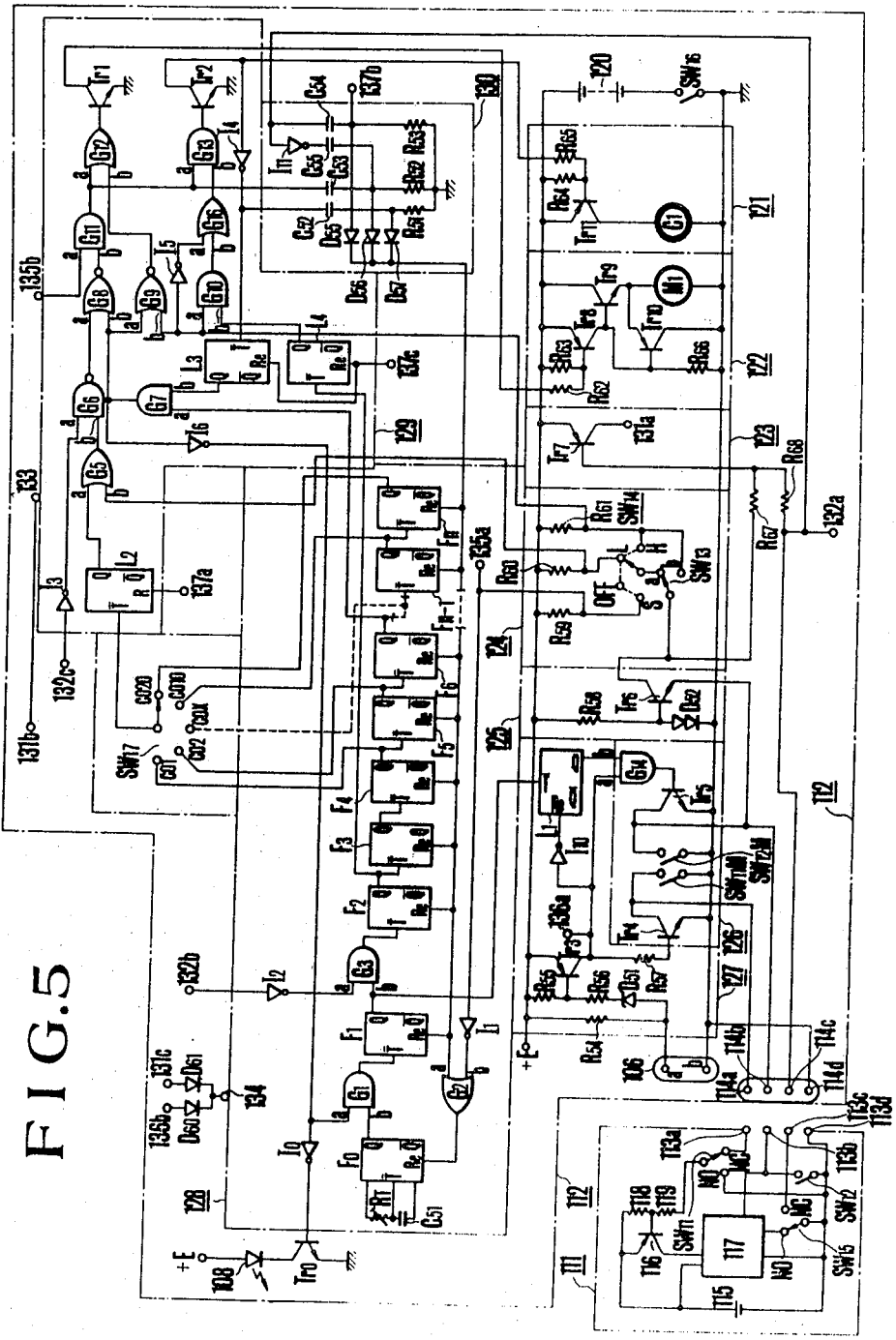
FIG. 5 is an electrical circuit diagram, partly in block form, of the camera of FIG. 4.

Referring to FIGS. 4, 5 and 6, there is shown another embodiment of the motor driven camera according to the present invention. As shown in FIG. 4, there is provided an interval control knob 105 for controlling the time intervals between the successive two frame exposures in discrete manner positioned on the unit housing 102. The third release button 16 of FIG. 2 is not employed. In FIG. 5, the circuitry of the motor driven camera is shown as comprising two sections enclosed in dot-and-dashed line blocks 111 and 112 incorporated in the camera body 101 and the motor drive unit 102, the latter being dismountably attached to the former and being electrically connected thereto through interconnection terminals 113a to 113d on the camera housing and through interconnection terminals 114a to 114d on the unit housing.

Block 111 includes a battery of a low voltage (for example 6 volts), a power supply control transistor 116, an exposure control circuit 117 of similar construction to that of the circuit 30 of FIG. 3, that is, including similar parts 117a to 117d to those 39a to 39d respectively, and first and second actuating switches SW11 and SW12 arranged to cooperate with the shutter release button 103 in a similar manner to that described in connection with FIGS. 2 and 3. When the shutter button 103 is depressed to the first stroke, the first switch SW11 is set from "NC" to "NO" position where a series circuit of resistors 118 and 119 is connected to the battery 115, thereby the transistor 116 is rendered conducting to initiate operation of the light-metering circuit 117a. Upon further depression of the button 103 to the second stroke, the second switch SW12 is closed to energize the first electromagnet 117c controlling actuation of the shutter release, and also to energize the second electromagnet 117d controlling the period of actuation of the shutter. When the shutter starts to be closed, a switch SW15 is moved from "NO" to "NC" position where an actuating signal of binary "0" level for the circuit 112 appears at the terminal 113c.

Block 112 includes a battery 120 of high level (for example, 18 volts) to which a clutch drive circuit 121, motor drive and brake circuit 122, power supply control circuit 123 for a pulsated co-ordination control system, mode selecting circuit 124, interface circuit 125, release actuating circuit 126 and control circuit 127 for the circuit 126 are connected in parallel through a main switch SW16. The co-ordination control system comprises a pulse forming circuit 128, gating network 129 and reset pulse forming circuit 130. These circuits will next be explained in detail in connection with the various operating modes.

The clutch drive circuit 121 comprises a solenoid of electromagnet type clutch C1, and a tansistor Tr11 with a base connected through a resistor R64 to the positive bus and through a resistor R65 to a transistor Tr2 in the gating network 129 and with a collector and emitter connected respectively to one end of the solenoid C1, the opposite end of the solenoid C1 being connected to the circuit earth, and to the positive bus.

The motor drive and brake circuit 122 comprises a winding of a motor M1, a switching transistor Tr9 with a collector connected to the positive bus, with an emitter connected to one end of the motor winding M1, the opposite end of which is connected to the circuit earth, a transistor Tr8 with a connector connected to a base of transistor Tr9 and with a base connected through a resistor R62 to a collector of a transistor Tr1 in the gating network 129 and through a resistor R63 to the positive bus, and a transistor with a collector and emitter connected across the motor winding M1 and with a base connected to the output stage of the transistor Tr8 which includes a resistor R66 connected between the collector of the transistor Tr8 and the circuit earth.

The power supply control circuit 123 comprises a transistor Tr7 with an emitter connected to the positive bus and with a collector connected to a terminal 131a which is connected to all of terminals 131b and 131c on the circuits 129 and 128 respectively. The base of transistor Tr7 is connected both to the terminal 114b through a resistor R67 and the interface circuit 125 and to the terminal 114c through a resistor R68.

The mode selecting circuit 124 comprises a first switch SW13 having two switched positions, a, and, b, for allowance of selection of any operating mode and for the priority of H mode and connected at its movable contact through the interface circuit 125 to the terminal 114b, and a second switch SW14 having a movable contact connected to the fixed contact, a, of the first switch SW13 and having four fixed contacts, S, OFF, L and H connected through respective resistors R59, R60 and R61, except for OFF contact, to the positive bus, the contact H being also connected to the fixed contact, b, of the first switch SW13.

The interface circuit 125 comprises a transistor Tr6 with a base connected to a point on connection between a resistor R58 and a diode string D52 which are connected between the positive and negative buses, with an emitter connected to the terminal 114b and with a collector connected to both of the circuits 123 and 124.

When the release button 104 of FIG. 4 is fully depressed to close the second actuating switch SW12M, a signal of "0" level appears at the terminal 113b and is directed through the terminal 114b and the conducted transistor Tr6 to the power supply control transistor Tr7 and to the mode selecting circuit 124.

With the switch SW13 set in "b" position, or with the combination of SW13 set in "a" position and SW14 set in "H" position, the latter setting being effected by operating the knob 107, the aforesaid signal of "0" level is directed to a NOR gate G9 and AND gate G10 at inputs, b, and, a, respectively, and further through an inverter I5 to an OR gate G16 at an input, a, while two signals of binary "1" level are applied from the contacts S and L of SW14 the former signal both to an OR gate G2 at an input, b, through an inverter I1 and to an AND gate G11 at an input, a, through a terminal 135a-and-terminal 135b connection the latter signal to an OR gate G5 at an input, b.

During each frame exposure, the switch SW15 remains in "NO" position so that a signal of "1" level appears at the terminal 113c. This signal is directed through the terminal 114c both to an AND gate G3 at an input, a, through a terminal 132a-and-terminal 132b connection and an inverter I2 and to a NAND gate G6 at an input, a, through a terminal 132a-and-terminal 132c connection and an inverter I3, thereby a clock pulse train from a first flip-flop F1 is prevented from passing through the AND gate G3 to a second flip-flop F2. In consequence, (n-1) number of flip-flops F2 to Fn are all set with signals of "0" level appearing at the output stages Q thereof and being applied to the inputs T of the respective next flip-flops F3 to Fn.

The output signal of "0" level from flip-flop F6 is directed to an AND gate G7 which produces a signal of "0" level. Responsive to this signal and the signal of "0" level from H contact of SW14, the NOR gate G9 produces a signal of "1" level which is applied through an OR gate G12 to the base of the first transistor Tr1, thereby the transistors Tr8 and Tr9 are turned on to energize the motor winding M1. On the other hand, as the switch SW15 is in "NO" position, the aforesaid signal of "1" level is applied through the inverter I3 to the input, a, of the NAND gate G6. A signal of "1" level from the NAND gate G6 is applied to an input, a, of a NOR gate G8 which produces a signal of "0" level. Responsive to this signal, the next stage AND gate G11 produces a signal of "0" level which is applied to an input, a, of an AND gate G13, thereby the transistors Tr2 and Tr11 are prevented from conducting, and the clutch solenoid C1 is not energized. In H mode, therefore, the full depression of the button 103 leads to the start of energization of the motor M but not to the start of operation the clutch C.

At the termination of duration of each frame exposure, the output of SW15 changes from "1" to "0" level, the latter appearing at the terminal 132a. This signal after being inverted to "1" level by I3 is applied to the input, a, of the NAND gate G6, while the input, b, of the NAND gate G6 is receptive of a "1" signal from the contact L of SW14 through the OR gate G5. Responsive to the output signal of "0" level from the NAND gate G6 and the aforesaid output signal of "0" level from the AND gate G7, the NOR gate G8 produces an output signal of "1" level which is applied to the input, b, of the AND gate G11. Responsive to the output signal of "1" level from the contact S of SW14 through the terminal 135b and the output signal of "1" level from the NOR gate G8, the AND gate G11 produces an output signal of "1" level which is applied to the inputs, a, of the OR gate G12 and the AND gate G13. As the signal of "0" level from the contact H of SW14 was applied through the inverter I5 and the OR gate G16 to the input, b, of the AND gate G13, when the switch SW15 is set to "NC" position, the output of the AND gate G13 changes from "0" to "1" level, thereby the transistors Tr2 and Tr11 are turned on to energize the clutch solenoid C1. From this onward, motion of the motor M is transmitted to the film winding mechanism in the camera body.

When the transistor Tr2 changes from the non-conducting to the conducting state with simultaneous occurrence of a change of the output of an inverter I4 from "0" to "1" level, a ramping pulse is applied from a condenser C52 through a diode D57 to all the reset terminals of the flip-flops F1 to Fn. Now assuming that no more fresh area is available in the film, then the winding operation can not be completed within a time interval, for example, 640 milliseconds. At the termination of duration of this time interval, the output of the flip-flop F6 changes from "0" to "1" level, the latter being applied to the input, a, of the AND gate G7. Whilst a latch circuit L3 was set by the output of the inverter I4 at the start of conduction of the transistor Tr2 to produce an output of "1" level which is applied to the input, b, of the AND gate G7, the transistors Tr1 and Tr2 are turned off to de-energize the motor M1 and clutch C1. The output signal of "1" level from the AND gate G7 after being inverted by an inverter I6 to "0" level is applied to an input, a, of an AND gate G1, thereby a pulse train is gated off not to pass from an oscillator Fo to the flip-flop F1. The output of the inverter I6 is applied through an inverter I0 to a base of a transistor Tr0 having an emitter connected to the circuit earth and having a collector connected through a light-emitting diode 108 to a voltage source E. Since the diode 108 is lit, the operator is informed of a fact that the used film has come to an end. The latch circuit L3 is reset by a pulse from a condenser C54 and a resistor R53 when the switch SW15 is set from "NC" to "NO" position.

Alternately assuming that the winding operation is completed within the predetermined time interval, in this instance, 640 milliseconds, when SW15 is set to "NO" position, the signal appearing at the terminal 132a changes from "0" to "1" level. As mentioned above, when this signal is of "1" level, the output of the AND gate G11 is of "0" level, so that the clutch C1 is no longer effective to transmit motion of the motor M1 to the film winding mechanism, while the motor M1 is maintained energized provided that SW12M remains closed.

In L mode, the motor M1 starts to rotate after a desired time interval from the termination of the preceding exposure, and then the clutch C1 starts to be effective for driving torque transmission after a predetermined time interval from the start of movement of the motor M1. In the latter connection, this time interval is determined to be equal to or slightly longer than that necessary to increase the speed of rotation of the motor from zero to a normal level. For this purpose, the reset pulse forming circuit 130 further includes a condenser C53 connected at one pole to the output of the AND gate G11 and at the opposite pole connected both to the circuit earth through a resistor R52 and to the common output terminal of the aforesaid condenser C52 and diode D57 through a diode D56. In a time interval of about 40 milliseconds after the all flip-flops F1 to Fn are reset by the output of the diode D56, the output Q of the flip-flop F2 changes from "0" to "1" level. This signal is applied to an input T of a latch circuit L4 which produces an output of "1" level. The output Q of the latch circuit L4 is connected to an input, b, of the AND gate G10 having an output connected to an input, b, of the OR gate G16. The output of the OR gate G16 is connected to an input, b, of the AND gate G13, so that the transistor Tr2 is turned on in response to the output Q of "1" level from the flip-flop F2.

To set a desired time interval in the circuit 112, the operator will turn the knob 105 of FIG. 4 to place an indicium in registry with an index. This knob 105 cooperates with a switch SW17 having a plurality of switched positions, CO1, CO2, . . . , CO20 for production of 160, 320 milliseconds, . . . , 20 seconds, for example, respectively.

When the release button 104 is fully depressed to close the switch SW12M, a signal of "0" level appears at the fixed contact L of the switch SW14 and is applied to the "b" input of the OR gate G5, while the "a" input of the OR gate G5 is receptive of a signal of "0" level from a latch circuit L2, since the switch SW15 is in "NO" position where all the flip-flops F2 to Fn are stopped to count clock pulses from the flip-flop F1 by the output of the inverter I2. Responsive to the output of "0" level from the AND gate G7, the next stage gate G6 produces an output of "1" level which is applied to the NOR gate G8. Responsive to the output of "0" level from the NOR gate G8, the AND gate G11 produces an output of "0" level, so that the transistors Tr1 and Tr2 remain in the non-conducting states.

At the termination of the first exposure, the switch SW15 is set to "NC" position. Although the signal at the terminal 132a changes to "0" level, the output of the OR gate G5 remains of "0" level until the latch circuit L2 is set to change the output from "0" to "1" level. With the switch SW17 set in "CO20" position as shown in FIG. 5, after 20 seconds from the time at which the switch SW15 is set to "NC" position, the latch circuit L2 is set by the output Q of the flip-flop Fn with the result that the motor M1 starts to rotate. Although the output of the AND gate G11 changes to "1" level, the OR gate G16 continues to produce an output of "0" level until the latch L4 is set by the output of the flip-flop F2. When the latch L4 is set, the outputs of the AND gate G10, OR gate G16 and AND gate G13 change from "0" to "1" level so that the clutch C1 is effective to operate the film winding mechanism. When SW15 is set to "NO" position, the motor M1 and clutch C1 are de-energized simultaneously. Such procedure repeats itself until a desired number of frame exposures are taken in sequence.

For single frame operation, the operator will turn the knob 107 to place the symbol S in registry with a not shown index. When the button 104 is fully depressed to close SW12M, a signal of "0" level appears at the fixed contact S of SW14, while two signals of "1" level appear at the fixed contacts L and H. The signal of "0" level is applied through terminal 135a-and-terminal 135b connection to the input, a, of the AND gate G11 so that the motor M1 and clutch C1 remain de-energized. When the exposure has been completed to set SW15 to "NC" position, and then is followed by the opening of SW12M, simultaneous appearance of "1" signals at the "a" and "b" inputs of the AND gate G11 occurs to start rotation of the motor M1. On the other hand, the output of the inverter I1 changes to "0" level with the start of operation of the oscillator Fo. In the predetermined time interval from the start of rotation of the motor M1, the flip-flop F2 is set, causing the output of the latch L4 to change to "1" level, with the result that the clutch C1 is effective to transmit motion of the momotor M1 to the film winding mechanism. When SW15 is set to "NO" position, the motor M1 and clutch C1 are de-energized, and the power supply control circuit Tr7 is rendered non-conducting.

In photography with a remote control device having an operating member connected to the plug 106, when the two terminals, a, and, b, of the plug 106 are short-circuited, a transistor Tr4 is rendered conducting to short-circuit the first actuating switch SW11M. The base of the transistor Tr4 is connected through a resistor R57 to the collector of a transistor Tr3 with an emitter connected to the positive bus, and with a base connected to a point on connection between resistors R55 and R56 which are connected between the positive bus and a constant voltage diode D51. Connected in parallel to the series circuit of transistors R55 and R56 and the diode D51 is a resistor R54. Conduction of the transistor Tr3 also causes power supply to the pulse forming circuit 128 through a terminal 136a-and-terminal 136b connection and through a diode D60. In a predetermined time interval from the start of conduction of the transistor Tr4, the flip-flop F1 is set to produce an output which is applied to an input T of a latch L1, with an output Q connected to an input, b, of an AND gate G14. Another input, a, of the AND gate G14 is connected to the collector of the transistor Tr3, so that when both of the inputs of the AND gate G14 are of "1" level, a second switching transistor Tr5 is rendered conducting to short-circuit the second actuating switch SW12M. When the transistor Tr3 is turned off, the latch L1 is reset by the output of an inverter I10.

FIG. 6 shows the details of the oscillator Fo of FIG. 5 as comprising a first NOR gate A, a second NOR gate B having an input connected to an output of the NOR gate A, a resistor RT, a condenser C51 connected in series to the resistor RT, the series circuit of the resistor RT and condenser C51 being connected between the outputs of the first and second NOR gates A and B to constitute an unstable multivibrator, and a transistor TRe with a collector connected to a point on connection between the output of the series circuit and the input of the first NOR gate A with an emitter connected to the circuit earth and with a base connected to a terminal Re. When a reset pulse of "1" level is applied to the terminal Re, the transistor TRe is rendered conducting to discharge the condenser C51 so that the output Q of the oscillator Fo is maintained at "0" level.

What is claimed is:
1. A camera system comprising:
   (A) a camera including:
      (a) first power source means for supplying a voltage,
      (b) an exposure control circuit connected to the first power source means,
      (c) first switch means connected to the exposure control circuit for switching between a first position for actuating the exposure control circuit and a second position for disabling the exposure control circuit, a connecting point between the first switch means and the exposure control circuit for forming a potential,
   (B) an electric drive device including:
      (d) second power source means having a voltage higher than that of the first power source means,
      (e) an electric drive control circuit connected to the second power source means,
      (f) voltage generating means connected to the second power source means,
      (g) resistive means connected between the second power source means and the voltage generating means,
         said resistive means forming a contact point for setting at the contact point a potential between the voltage generating means lower than that at the first power source means,
      (h) a transistor having a base connected between the voltage generating means and the resistive means and having an emitter for producing an emitter current corresponding to the base voltage,
         said transistor having an emitter connected to the connecting point between the first switch means and the first control circuit, said transistor having a collector connected to the driving control circuit,
         said transistor being set to conduct when the first switch means in in the first position and set to be inverted when the first switch means is in the second position.

2. A camera system according to claim 1, wherein the electric drive device is removably attached to the camera, and the electric drive device and the camera have respective connection terminals for transmitting the output of the transistor.

3. A camera system according to claim 2, wherein the drive device further comprises second switch means connected parallel to the first switch means.

4. A camera system according to claim 3, wherein the electric drive device further comprises:
   a switching element connected parallel to said second switch means,
   signal generating means for controlling the switching element.

5. A camera system according to claim 4, wherein the signal generating means has an input terminal for receiving an external signal and for generating a signal to actuate the switching element when the external signal is applied to the terminal.

6. A camera with an electric drive device comprising:
   first power source means for producing a voltage;
   an exposure control circuit connected to the first power source means;
   first switch means for switching between a closed position and an open position, said first switch means supplying power from the first power source means to the exposure control circuit when said first switch means is closed and inhibiting power when said first switch means is opened;
   second switch means for switching the exposure control circuit off when it is opened and switching the exposure control circuit on when it is closed;
   second power source means for supplying a higher voltage than the first power source means;
   an electric driving control circuit connected to the second power source means;
   accumulating means for charging from the first power source means when the first switch means is opened and for discharging when the first switch means is closed;
   a first transistor for being turned on by the discharge of the accumulating means;
   a second transistor for being turned on by the turning-on of the first transistor, said second transistor forming a self-holding circuit together with the first transistor, and
   a third transistor having a base for receiving the output of the second transistor, having an emitter connected to the second switch means, having a collector connected to the electric driving control circuit, for turning on when the second switch means is closed and for turning off when the second switch means is opened, so as to control the operation of the electric drive control circuit.

7. A camera according to claim 6, further comprising third switch means connected parallel to the first switch means, and fourth switch means connected parallel to the second switch means.

8. A camera according to claim 7, further comprising a first switching element connected parallel to the third switch means, a second switching element connected parallel to the fourth switch means, and signal generating means for controlling the first and second switching elements.

9. A camera according to claim 8, in which the signal generating means comprises an input terminal and is arranged to generate a signal for actuating the first and second switching elements when an outside signal is applied to the input terminal.

* * * * *